(12) United States Patent
Huang et al.

(10) Patent No.: US 12,370,859 B2
(45) Date of Patent: Jul. 29, 2025

(54) HYDRAULIC SUSPENSION SYSTEM AND VEHICLE HAVING SAME

(71) Applicant: BYD COMPANY LIMITED, Guangdong (CN)

(72) Inventors: Fei Huang, Shenzhen (CN); Haolun Xu, Shenzhen (CN); Zhiye Yang, Shenzhen (CN); Feng Wang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/608,279

(22) Filed: Mar. 18, 2024

(65) Prior Publication Data
US 2024/0217302 A1    Jul. 4, 2024

Related U.S. Application Data

(63) Continuation of application No. PCT/CN2022/144183, filed on Dec. 30, 2022.

(30) Foreign Application Priority Data

Dec. 30, 2021  (CN) .......................... 202111652021.8

(51) Int. Cl.
  *B60G 17/08* (2006.01)
  *B60G 13/08* (2006.01)

(52) U.S. Cl.
  CPC ............. *B60G 17/08* (2013.01); *B60G 13/08* (2013.01); *B60G 2202/12* (2013.01);
  (Continued)

(58) Field of Classification Search
  CPC .............. B60G 17/08; B60G 2202/24; B60G 2500/112; B60G 2500/30;
  (Continued)

(56) References Cited

U.S. PATENT DOCUMENTS 5,562,305 A * 10/1996 Heyring ............... B60G 17/056
                                                  280/124.161
6,519,517 B1      2/2003 Heyring et al.
(Continued)

FOREIGN PATENT DOCUMENTS

CN        1546332 A      11/2004
CN        1930013 A       3/2007
(Continued)

OTHER PUBLICATIONS

Computer generated English translation of CN 1546332 (Year: 2024).*

(Continued)

*Primary Examiner* — Paul N Dickson
*Assistant Examiner* — Tiffany L Webb

(57) ABSTRACT

A hydraulic suspension system includes: a central control apparatus and height adjustment apparatuses respectively corresponding to wheels of a vehicle. The central control apparatus includes a housing and a moving member movably disposed in the housing and dividing the housing into a first region and a second region in a moving direction of the moving member. The first region includes a first chamber and a second chamber isolated from each other. The second region includes a third chamber and a fourth chamber isolated from each other. The first, second, third, and fourth chambers respectively communicated with the height adjustment apparatuses. The height adjustment apparatuses communicated with the first chamber and the second chamber correspond to wheels located on a first diagonal of the vehicle. The height adjustment apparatuses communicated with the third chamber and the fourth chamber correspond to wheels located on a second diagonal of the vehicle.

22 Claims, 3 Drawing Sheets

(52) U.S. Cl.
CPC .... *B60G 2202/24* (2013.01); *B60G 2500/112* (2013.01); *B60G 2500/30* (2013.01)

(58) Field of Classification Search
CPC ...... B60G 2204/8102; B60G 2800/914; B60Y 2400/86
See application file for complete search history.

(56) References Cited

U.S. PATENT DOCUMENTS

| | | | | |
|---|---|---|---|---|
| 8,123,235 | B2 * | 2/2012 | Monk | B60G 21/06 |
| | | | | 280/124.161 |
| 8,544,863 | B2 * | 10/2013 | Revill | B60G 21/06 |
| | | | | 280/124.16 |
| 9,061,735 | B2 * | 6/2015 | Heyring | B63B 39/00 |
| 11,945,557 | B2 * | 4/2024 | Walker | B63B 39/03 |
| 2013/0233226 | A2 | 9/2013 | Heyring et al. | |
| 2024/0217303 | A1 * | 7/2024 | Lian | F16F 9/10 |
| 2024/0308292 | A1 * | 9/2024 | Xu | B60G 17/015 |
| 2024/0317005 | A1 * | 9/2024 | Xu | B60G 17/056 |

FOREIGN PATENT DOCUMENTS

| | | | |
|---|---|---|---|
| CN | 101189139 | A | 5/2008 |
| CN | 106379130 | A | 2/2017 |
| CN | 109895576 | A | 6/2019 |
| CN | 111306129 | A | 6/2020 |
| CN | 210652583 | U | 6/2020 |
| CN | 113382921 | A | 9/2021 |
| JP | 2005088854 | A | 4/2005 |
| JP | 4518008 | B2 * | 8/2010 |
| JP | 4760331 | B2 * | 8/2011 |

OTHER PUBLICATIONS

Computer generated English translation of JP 4518008 (Year: 2024).*
Computer generated English translation of JP 4760331 (Year: 2024).*
International Search Report and Written Opinion for Application No. PCT/CN2022/144183, mailed on Mar. 21, 2023, 9 pages.

* cited by examiner

HYDRAULIC SUSPENSION SYSTEM AND VEHICLE HAVING SAME

CROSS-REFERENCE TO RELATED APPLICATIONS

The application is a continuation application of International Patent Application No. PCT/CN2022/144183 filed on Dec. 30, 2022, which is based on and claims priority to and benefits of Chinese Patent Application No. 202111652021.8, filed on Dec. 30, 2021. The entire content of all of the above-referenced applications is incorporated herein by reference.

FIELD

The present disclosure relates to the field of vehicle technologies, and particularly, to a hydraulic suspension system and a vehicle having the same.

BACKGROUND

A suspension system plays a very important role in safety and stability of a vehicle. However, to achieve vehicle comfort and vehicle operation stability, contradictory requirements are imposed on characteristics of a vehicle suspension. Currently, most suspension systems are designed to provide better comfort at the expense of operation stability to some extent.

SUMMARY

The present disclosure resolves one of the technical problems in the related art at least to some extent.

The present disclosure provides a hydraulic suspension system, to improve the handling stability of a vehicle.

The present disclosure further provides a vehicle having the foregoing hydraulic suspension system.

In a first aspect, the hydraulic suspension system according to an embodiment of the present disclosure includes: a central control apparatus and height adjustment apparatuses respectively corresponding to wheels of a vehicle. The central control apparatus includes a housing, and a moving member movably disposed in the housing and dividing the housing into a first region and a second region in a moving direction of the moving member. The first region includes a first chamber and a second chamber isolated from each other. The second region includes a third chamber and a fourth chamber isolated from each other. The first chamber, the second chamber, the third chamber, and the fourth chamber respectively communicated with the height adjustment apparatuses. The height adjustment apparatuses communicated with the first chamber and the second chamber correspond to wheels located on a first diagonal of the vehicle. The height adjustment apparatuses communicated with the third chamber and the fourth chamber correspond to wheels located on a second diagonal of the vehicle.

According to the hydraulic suspension system in this embodiment of the present disclosure, when a single wheel of the vehicle encounters an obstacle, the single wheel is lifted up, and a medium in the height adjustment apparatus corresponding to the single wheel enters the central control apparatus, causing a change of the moving member. Therefore, the medium enters the height adjustment apparatuses corresponding to the wheels on the other diagonal, lowering the wheels on the other diagonal. In this way, time for the wheels on the other diagonal to get off a ground is prolonged, and the wheels on the other diagonal are less likely to get off the ground. Therefore, the handling stability of the vehicle is improved.

In some embodiments of the present disclosure, a volume change of the first chamber and the second chamber in the first region is opposite to a volume change of the third chamber and the fourth chamber in the second region.

In some embodiments of the present disclosure, the first chamber, the second chamber, the third chamber, and the fourth chamber are disposed in the moving direction of the moving member.

In some embodiments of the present disclosure, in an initial state, a volume of the first chamber is the same as a volume of the fourth chamber, and a volume of the second chamber is the same as a volume of the third chamber.

In some embodiments of the present disclosure, the height adjustment apparatus comprises at least a front-axle height adjustment apparatus and a rear-axle height adjustment apparatus, one of the front-axle height adjustment apparatus and the rear-axle height adjustment apparatus is communicated with the first chamber and the third chamber, and the other one of the front-axle height adjustment apparatus and the rear-axle height adjustment apparatus is communicated with the second chamber and the fourth chamber.

In some embodiments of the present disclosure, the height adjustment apparatus comprises at least a front-axle height adjustment apparatus and a rear-axle height adjustment apparatus, one of the front-axle height adjustment apparatus and the rear-axle height adjustment apparatus is communicated with the first chamber and the fourth chamber, and the other one of the front-axle height adjustment apparatus and the rear-axle height adjustment apparatus is communicated with the second chamber and the third chamber.

In some embodiments of the present disclosure, the hydraulic suspension system includes a liquid storage apparatus, and the central control apparatus includes first connection ports. Each of the height adjustment apparatuses includes a shock absorber, the shock absorber is disposed in correspondence to one of the wheels and communicated with one of the first connection ports, the liquid storage apparatus is configured to deliver oil to the shock absorbers. The first connection ports comprise a first port, a second port, a third port, and a fourth port, and the first port, the second port, the third port, and the fourth port are respectively communicated with the first chamber, the second chamber, the third chamber, and the fourth chamber.

In some embodiments of the present disclosure, the central control apparatus further includes a second connection port. Each of the second connection ports is configured to communicate with the liquid storage apparatus. The second connection ports includes a fifth port, a sixth port, a seventh port, and an eighth port. The fifth port, the sixth port, the seventh port, and the eighth port are respectively communicated with the first chamber, the second chamber, the third chamber, and the fourth chamber.

In some embodiments of the present disclosure, an axis of the first connection ports is perpendicular to that of the second connection ports.

In some embodiments of the present disclosure, the hydraulic suspension system further includes a first control valve, a second control valve, a third control valve, and a fourth control valve. The first control valve is disposed between the fifth port and the liquid storage apparatus. The second control valve is disposed between the sixth port and the liquid storage apparatus. The third control valve is disposed between the seventh port and the liquid storage apparatus. The fourth control valve is disposed between the eighth port and the liquid storage apparatus.

In some embodiments of the present disclosure, a first connection channel is disposed between the first control valve and the fourth control valve. A fifth control valve is disposed on the first connection channel. A second connection channel is disposed between the second control valve and the third control valve. A sixth control valve is disposed on the second connection channel.

In some embodiments of the present disclosure, the moving member includes a first part, a second part, and a third part. The first part moves axially along a side wall of the housing to divide the housing into the first region and the second region. The second part is connected to one side of the first part, and moves along the side wall of the housing to divide the first region into the first chamber and the second chamber. The third part is connected to the other side of the first part, and moves along the side wall of the housing to divide the second region into the third chamber and the fourth chamber.

In some embodiments of the present disclosure, the housing has a first cylindrical body, a second cylindrical body, and a third cylindrical body that are disposed in the moving direction of the moving member. An internal diameter of the second cylindrical body is greater than that of the first cylindrical body and greater than that of the third cylindrical body. The first chamber is formed between the second part and an inner wall of the first cylindrical body. The first part is in contact with an inner wall of the second cylindrical body to divide the second cylindrical body into the second chamber and the third chamber. The fourth chamber is formed between the third part and an inner wall of the third cylindrical body.

In some embodiments of the present disclosure, an extension direction of the first part is perpendicular to an extension direction of the second part and the extension direction of the third part.

In some embodiments of the present disclosure, a restoring spring is disposed between the moving member and an end wall of the housing.

In some embodiments of the present disclosure, the shock absorber has a shock absorber housing, a piston, and a piston rod. The shock absorber housing is configured to be connected to one of the wheels. The piston is located in the shock absorber housing, and is coupled with the shock absorber housing to define an upper chamber and a lower chamber. One end of the piston rod is connected to the piston. The piston rod is configured to be connected to a vehicle body. An oil channel is disposed in the piston rod. The oil channel is communicated with the lower chamber. The liquid storage apparatus is configured to deliver the oil to the shock absorber through the oil channel.

In some embodiments of the present disclosure, each of the height adjustment apparatuses further includes a connection channel and an accumulator module. The connection channel is connected between the central control apparatus and the shock absorber.

The accumulator module includes a damping adjustment accumulator and an opening adjustment valve. The damping adjustment accumulator is connected between the shock absorber and the central control apparatus. The opening adjustment valve is disposed between the damping adjustment accumulator and the shock absorber.

In some embodiments of the present disclosure, the accumulator module further includes a stiffness adjustment accumulator and a stiffness adjustment valve. A stiffness adjustment connection point is disposed on the connection channel. The stiffness adjustment accumulator is communicated with the stiffness adjustment connection point. The stiffness adjustment valve is disposed between the stiffness adjustment accumulator and the stiffness adjustment connection point.

In some embodiments of the present disclosure, each of the height adjustment apparatuses further includes a seventh control valve. The seventh control valve is disposed between the stiffness adjustment connection point and the damping adjustment accumulator.

In some embodiments of the present disclosure, the central control apparatus is of a cylinder structure.

In a second aspect, a vehicle according to an embodiment of the present disclosure includes the hydraulic suspension system according to the foregoing embodiment of the present disclosure.

According to the vehicle in this embodiment of the present disclosure, when the vehicle has a rolling tendency, rolling can be inhibited. When four wheels of the vehicle are at inconsistent heights, a height of a vehicle body may be adjusted to reduce an inclination magnitude of the vehicle, to avoid the vehicle rolling.

Additional aspects and advantages of the present disclosure will be given in the following description, some of which will become apparent from the following description or may be learned from practices of the present disclosure.

Figure 1:
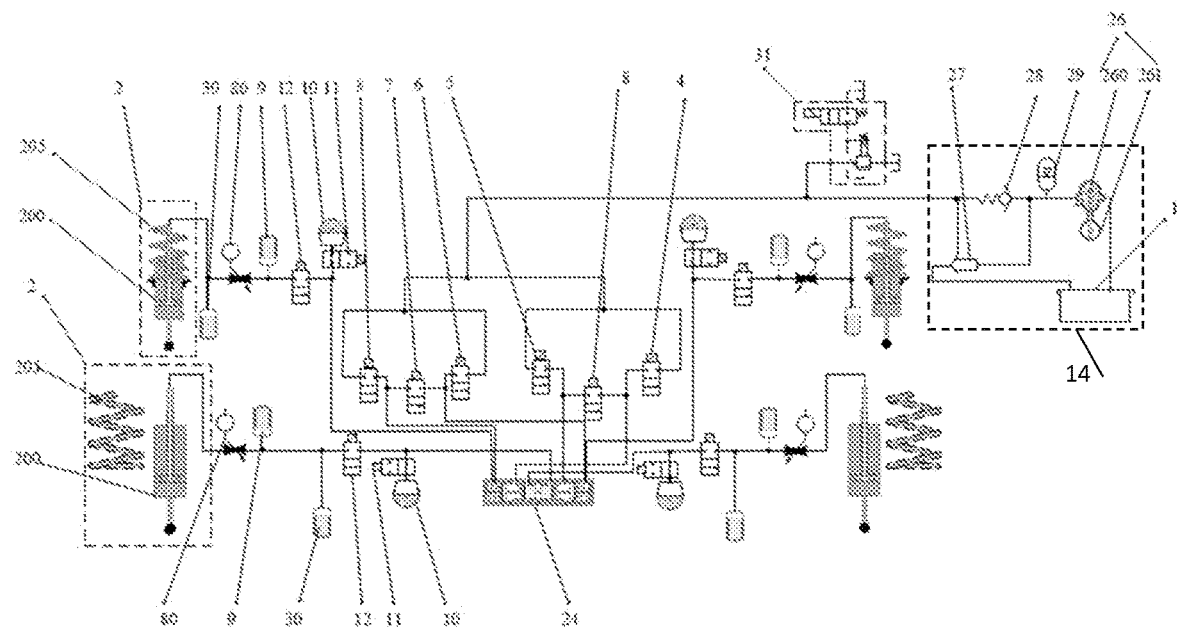
FIG. 1 and FIG. 2 are schematic diagrams of a hydraulic suspension system according to different embodiments of the present disclosure.

REFERENCE NUMERALS hydraulic suspension system 1000;
liquid storage pot 1;
shock absorber assembly 2; shock absorber 200; shock absorber housing 201; upper chamber 2011; lower chamber 2012; piston 202; piston rod 203; oil channel 204; shock absorption spring 205;
first control valve 3; second control valve 4; third control valve 5; fourth control valve 6;
fifth control valve 7; sixth control valve 8;
opening adjustment valve 80;
damping adjustment accumulator 9;
stiffness adjustment accumulator 10; metal corrugated pipe 101;
stiffness adjustment valve 11;
seventh control valve 12;
central accumulator 13; central accumulation adjustment valve 32;
central control apparatus 24; housing 240; moving member 241; first part 2410; second part 2411; third part 2412; first chamber 243; second chamber 244; third chamber 245; fourth chamber 246; first restoring spring 247; second restoring spring 248; guide component 249; first guide member 2490; second guide member 2491; first connection port 2401; first port 24011; second port 24012; third port 24013; fourth port 24014; second connection port 2402; fifth port 24021; sixth port 24022; seventh port 24023; eighth port 24024; first cylindrical body 2403; second cylindrical body 2404; third cylindrical body 2405;

control pump 26; control valve body 260; drive motor 261; oil return valve 27; one-way valve 28; pressure maintaining accumulator 29; pressure reduction accumulator 30; pressure relief valve 31.

DETAILED DESCRIPTION

The following describes the embodiments of the present disclosure in detail. Examples of the embodiments are shown in the accompanying drawings. Same or similar reference numerals are always used to represent same or similar elements or elements with same or similar functions. The embodiments described below with reference to the accompanying drawings are examples and to explain the present disclosure, and cannot be construed as a limitation on the present disclosure.

The following describes a hydraulic suspension system 1000 according to an embodiment of the present disclosure with reference to FIG. 1 to FIG. 7. The hydraulic suspension system 1000 is used for a vehicle. The hydraulic suspension system 1000 is configured to connect an axle and a vehicle body of the vehicle.

Figure 2:
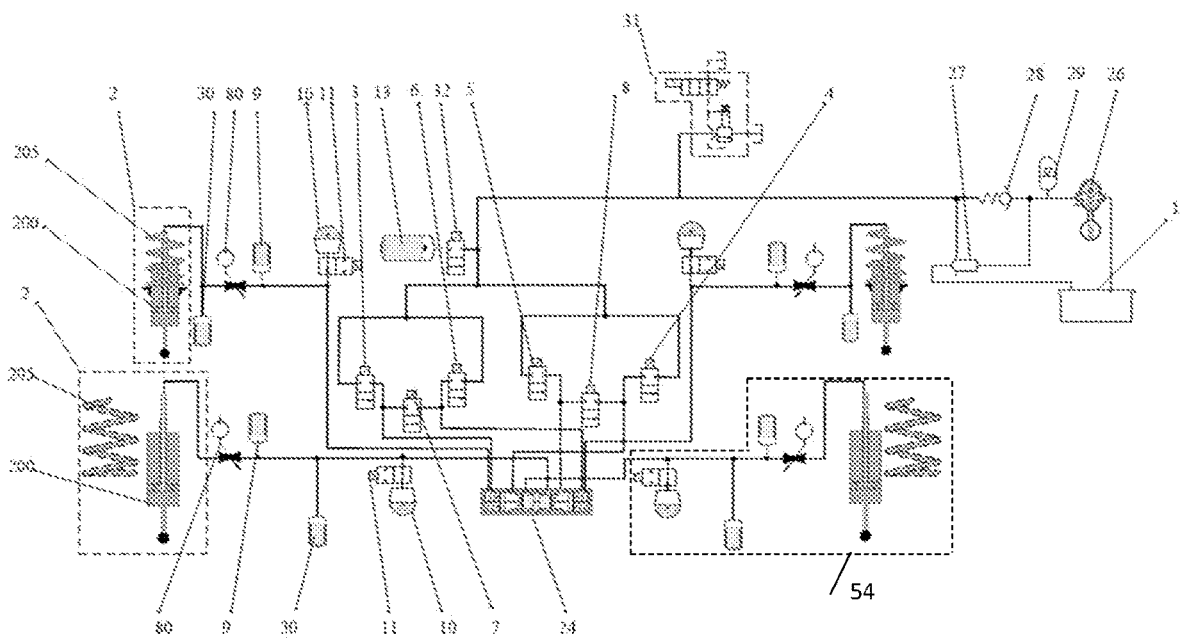
Figure 3:
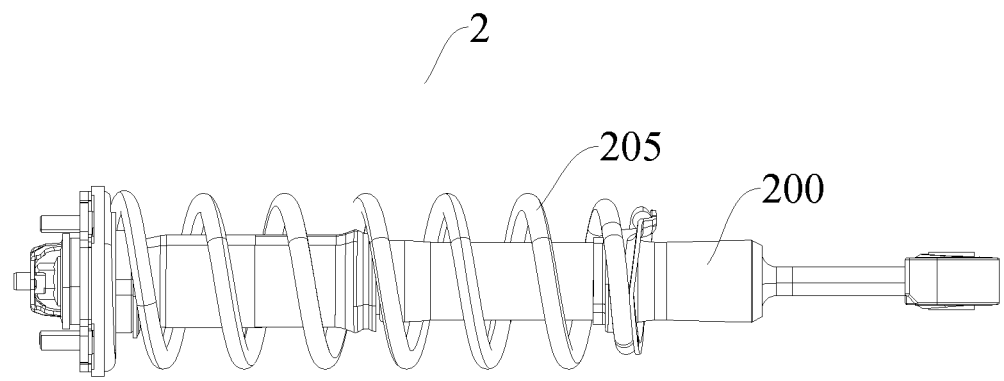
FIG. 3 is a schematic diagram of a left-front side shock absorber assembly and a right-front side shock absorber assembly according to an embodiment of the present disclosure.
Figure 4:
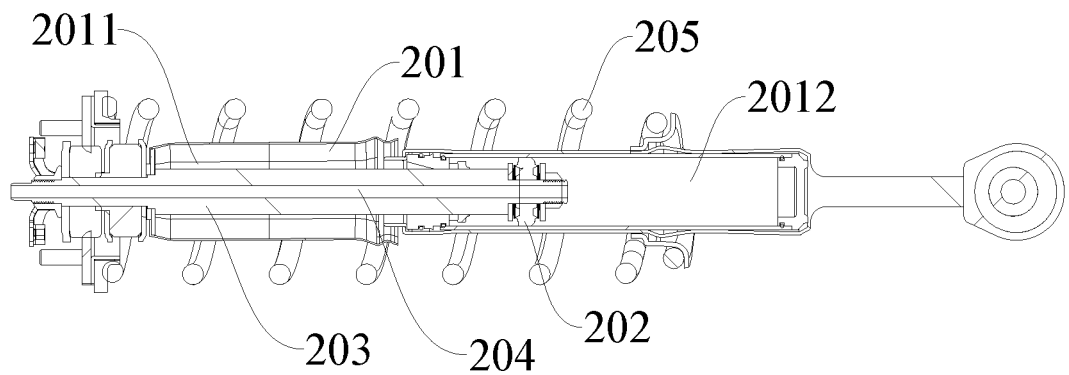
FIG. 4 is a sectional view of a shock absorber assembly shown in FIG. 3.
Figure 5:
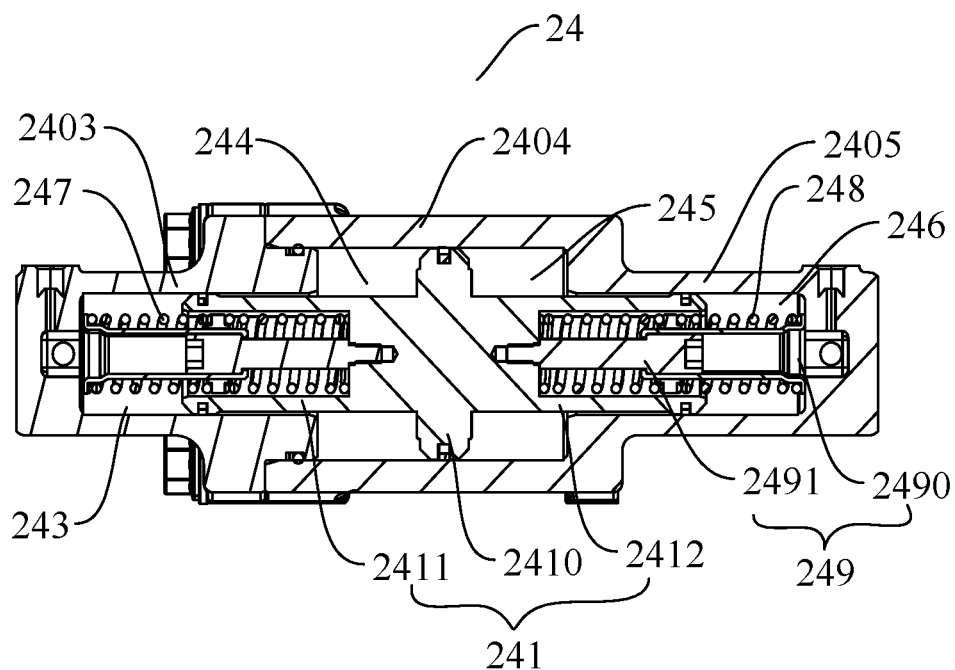
FIG. 5 is a sectional view of a central control apparatus according to an embodiment of the present disclosure.

As shown in FIG. 1, FIG. 2, and FIG. 5, the hydraulic suspension system 1000 according to this embodiment of the present disclosure includes a plurality of height adjustment apparatuses 54 and a central control apparatus 24. The plurality of height adjustment apparatuses are arranged/disposed in one-to-one correspondence to a plurality of wheels of the vehicle. Each height adjustment apparatus is connected to the vehicle body of the vehicle. In an embodiment, the plurality of height adjustment apparatuses include front-axle height adjustment apparatuses and rear-axle height adjustment apparatuses. The front-axle height adjustment apparatuses are respectively arranged in correspondence to a left front wheel and a right front wheel. The rear-axle height adjustment apparatuses are respectively arranged in correspondence to a left rear wheel and a right rear wheel. In the description of the present disclosure, for ease of description, the height adjustment apparatus corresponding to the left front wheel is referred to as a left front height adjustment apparatus, the height adjustment apparatus corresponding to the right front wheel is referred to as a right front height adjustment apparatus, the height adjustment apparatus corresponding to the left rear wheel is referred to as a left rear height adjustment apparatus, and the height adjustment apparatus corresponding to the right rear wheel is referred to as a right rear height adjustment apparatus. In the present disclosure, the height adjustment apparatus is configured to adjust a height of the vehicle, that is, a relative distance between the wheel and the vehicle body.

The central control apparatus 24 includes a housing 240 and a moving member 241. The moving member 241 is movably arranged in the housing 240, and divides the housing 240 into a first region and a second region in a moving direction of the moving member 241. The first region includes a first chamber 243 and a second chamber 244 that are isolated from each other. The second region includes a third chamber 245 and a fourth chamber 246 that are isolated from each other. The first chamber 243, the second chamber 244, the third chamber 245, and the fourth chamber 246 are configured to be filled with a medium. In the present disclosure, the medium is oil. In another embodiment, the medium may be another medium, corresponding to that in the height adjustment apparatus.

In an embodiment, the first chamber 243, the second chamber 244, the third chamber 245, and the fourth chamber 246 are all filled with oil. When an amount of oil in the first region increases, acting force may be applied to the moving member 241 to move to the second region. When an amount of oil in the second region increases, acting force may be applied to the moving member 241 to move to the first region. In some examples of the present disclosure, the first chamber 243, the second chamber 244, the third chamber 245, and the fourth chamber 246 are arranged/disposed in sequence in the moving direction of the moving member 241. Certainly, it can be understood that an arrangement sequence of the first chamber 243, the second chamber 244, the third chamber 245, and the fourth chamber 246 is not limited there to as long as it is ensured that the first chamber 243 and the second chamber 244 are distributed in the first region and the third chamber 245 and the fourth chamber 246 are distributed in the second region.

The first chamber 243, the second chamber 244, the third chamber 245, and the fourth chamber 246 are communicated with the plurality of height adjustment apparatuses in one-to-one correspondence. The wheels corresponding to the height adjustment apparatuses communicated with the first chamber 243 and the second chamber 244 are located on one diagonal of the vehicle. The wheels corresponding to the height adjustment apparatuses communicated with the third chamber 245 and the fourth chamber 246 are also located on the other diagonal of the vehicle.

In an embodiment, when the wheels corresponding to the height adjustment apparatuses communicated with the first chamber 243 and the second chamber 244 are the left front wheel and the right rear wheels, the wheels corresponding to the height adjustment apparatuses communicated with the third chamber 245 and the fourth chamber 246 may be the right front wheel and the left rear wheel. In this case, the first chamber 243 is communicated with one of the left front height adjustment apparatus and the right rear height adjustment apparatus. The second chamber 244 is communicated with the other of the left front height adjustment apparatus and the right rear height adjustment apparatus. The third chamber 245 is communicated with one of the right front height adjustment apparatus and the left rear height adjustment apparatus. The fourth chamber 246 is communicated with the other of the right front height adjustment apparatus and the left rear height adjustment apparatus.

When the wheels corresponding to the height adjustment apparatuses communicated with the first chamber 243 and the second chamber 244 are the right front wheel and the left rear wheel, the wheels corresponding to the height adjustment apparatuses communicated with the third chamber 245 and the fourth chamber 246 are the left front wheel and the right rear wheel. In this case, the first chamber 243 is communicated with one of the right front height adjustment apparatus and the left rear height adjustment apparatus. The second chamber 244 is communicated with the other of the right front height adjustment apparatus and the left rear height adjustment apparatus. The third chamber 245 is communicated with one of the left front height adjustment apparatus and the right rear height adjustment apparatus.

The fourth chamber 246 is communicated with the other of the left front height adjustment apparatus and the right rear height adjustment apparatus.

It should further be noted that when one chamber of the central control apparatus 24 is communicated with the corresponding height adjustment apparatus, the oil may flow between the chamber and the height adjustment apparatus. When a distance between the corresponding wheel and the vehicle body changes, the oil may flow into or out of the height adjustment apparatus. In this embodiment of the present disclosure, the central control apparatus 24 is of a cylinder structure.

When a single wheel of the vehicle encounters an obstacle, the single wheel is lifted up, and the oil in the height adjustment apparatus corresponding to the single wheel enters the central control apparatus, causing a change of the moving member. Therefore, the medium enters the height adjustment apparatuses corresponding to the wheels on the other diagonal, lowering the wheels on the other diagonal. In this way, time for the wheels on the other diagonal to get off a ground is prolonged, and the wheels on the other diagonal are less likely to get off the ground. Therefore, handling stability of the vehicle is improved.

For example, when the left front wheel encounters an obstacle, the left front wheel is lifted up. When the vehicle keeps running, a center of gravity of the vehicle is lifted up, and there is a risk for the right front wheel and the left rear wheel to get off the ground. As a result, there is a risk of losing control of the vehicle. In the present disclosure, with arrangement of the central control apparatus, when the left front wheel encounters an obstacle, the oil in the left front height adjustment apparatus flows into the first region, and the oil flowing into the first region acts on the moving member 241, so that the moving member 241 moves to the second region. In this way, the oil in the second region is squeezed into the right front height adjustment apparatus and the left rear height adjustment apparatus, so that a distance between the right front wheel and the vehicle body and a distance between the left rear wheel and the vehicle body increase, and the right front wheel and the left rear wheel are lowered. Therefore, a risk that the right front wheel and the left rear wheel get off the ground is reduced, and the handling stability of the vehicle is improved.

On the other hand, when the vehicle has a rolling tendency, for example, the left front wheel and the left rear wheel are lifted up, the oil in the left front height adjustment apparatus and the left rear height adjustment apparatus respectively flow into the first region and the second region. Acting force of the first region on the moving member 241 is opposite to that of the second region on the moving member 241. The two pieces of acting force in opposite directions interact, so that the moving member 241 does not move, that is, the oil does not flow between the central control apparatus 24 and the right front height adjustment apparatus and the right rear height adjustment apparatus, and the right front height adjustment apparatus and the right rear height adjustment apparatus remain in current height statuses. This can inhibit a change in a distance between the right front wheel and the vehicle body and a change in a distance between the right rear wheel and the vehicle body, so that rolling can be inhibited.

When the left front wheel of the vehicle encounters an obstacle, for example, a stone, the left front wheel is lifted up, and the oil in the left front height adjustment apparatus is discharged into one of the first region and the second region, so that the moving member 241 may move, and the oil in the other of the first region and the second region is discharged into the right front height adjustment apparatus and the left rear height adjustment apparatus, increasing a distance between the right front wheel and the vehicle body and a distance between the left rear wheel and the vehicle body. Therefore, the height of the vehicle body may be adjusted to reduce an inclination magnitude of the vehicle, to avoid the vehicle rolling.

Certainly, it can be understood that the foregoing cases are merely examples for description. When the vehicle encounters another working condition, for example, the right front wheel is lifted up, or the left rear wheel is lifted up, the oil flows according to the foregoing linkage principle, to avoid the vehicle rolling. Details under each working condition are not described herein.

According to the hydraulic suspension system 1000 in this embodiment of the present disclosure, with arrangement of the central control apparatus 24 and the plurality of groups of height adjustment apparatuses, when the vehicle has the rolling tendency, rolling can be inhibited. When the four wheels of the vehicle are at inconsistent heights, the height of the vehicle body may be adjusted to reduce the inclination magnitude of the vehicle, to avoid the vehicle rolling.

In some embodiments of the present disclosure, a volume change of the first chamber 243 and the second chamber 244 in the first region is opposite to that of the third chamber 245 and the fourth chamber 246 in the second region. That is, when volumes of the first chamber 243 and the second chamber 244 increase, volumes of the third chamber 245 and the fourth chamber 246 decrease. Alternatively, when volumes of the first chamber 243 and the second chamber 244 decrease, volumes of the third chamber 245 and the fourth chamber 246 increase. Therefore, a reliable movement of the moving member 241 can be ensured, and the central control apparatus 24 can be ensured to inhibit rolling.

In some examples of the present disclosure, in an initial state, a volume of the first chamber 243 is the same as that of the fourth chamber 246, and a volume of the second chamber 244 is the same as that of the third chamber 245. Therefore, the moving member 241 is at a middle position in the initial state, which ensures a same response to each height adjustment apparatus.

In some embodiments of the present disclosure, one of the front-axle height adjustment apparatus and the rear-axle height adjustment apparatus is communicated with the first chamber 243 and the third chamber 245, and the other of the front-axle height adjustment apparatus and the rear-axle height adjustment apparatus is communicated with the second chamber 244 and the fourth chamber 246. In an embodiment, an example in which the left front height adjustment apparatus is communicated with the first chamber 243, the right front height adjustment apparatus is communicated with the third chamber 245, the left rear height adjustment apparatus is communicated with the fourth chamber 246, and the right rear height adjustment apparatus is communicated with the second chamber 244 is used for description.

When the vehicle has a pitching tendency, for example, the vehicle nods due to emergency braking, that is, a distance between a front part of the vehicle body of the vehicle and the wheel corresponding to the front-axle height adjustment apparatus decreases, the oil in the left front height adjustment apparatus and the right front height adjustment apparatus is respectively discharged to the first chamber 243 and the third chamber 245. Acting force of the first region on the moving member 241 is opposite to that of the second region on the moving member 241. The two pieces of acting force in opposite directions interact, so that the moving member 241 does not move, that is, the oil does not flow between the central control apparatus 24 and the right rear height adjustment apparatus and the left rear height adjustment apparatus, and the left rear height adjustment apparatus and the right rear height adjustment apparatus remain in current height statuses. This can inhibit a change in a distance between the left rear wheel and the vehicle body and a change in the distance between the right rear wheel and the vehicle body, so that nodding can be inhibited, that is, the vehicle is endowed with an anti-pitching function.

Certainly, it can be understood that the foregoing description about flowing of the oil is merely examples of description for describing an anti-pitching principle. When the vehicle nods due to emergency starting, or has the pitching tendency under another working condition, the hydraulic suspension system 1000 may provide anti-pitching force by using the anti-pitching principle.

In some embodiments of the present disclosure, one of the front-axle height adjustment apparatus and the rear-axle height adjustment apparatus is communicated with the first chamber 243 and the fourth chamber 246, and the other of the front-axle height adjustment apparatus and the rear-axle height adjustment apparatus is communicated with the second chamber 244 and the third chamber 245. In an embodiment, an example in which the left front height adjustment apparatus is communicated with the first chamber 243, the right front height adjustment apparatus is communicated with the fourth chamber 246, the left rear height adjustment apparatus is communicated with the third chamber 245, and the right rear height adjustment apparatus is communicated with the second chamber 244 is used for description.

When the vehicle has the rolling tendency, for example, a distance between the left front wheel and the vehicle body decreases, and a distance between the left rear wheel and the vehicle body decreases, the oil flowing out of the left front height adjustment apparatus is discharged to the first chamber 243, and the oil discharged from the left rear height adjustment apparatus flows to the third chamber 245. That is, acting force of the first region on the moving member 241 is opposite to that of the second region on the moving member 241. The two pieces of acting force in opposite directions interact, so that the moving member 241 does not move, that is, the oil does not flow between the central control apparatus 24 and the right front height adjustment apparatus and the right rear height adjustment apparatus, and the right front height adjustment apparatus and the right rear height adjustment apparatus remain in current height statuses. This can inhibit a change in the distance between the right front wheel and the vehicle body and a change in the distance between the right rear wheel and the vehicle body, so that rolling can be inhibited.

Certainly, it can be understood that the foregoing description about flowing of the oil is merely examples of description for describing an anti-rolling principle. When the vehicle encounters another rolling working condition, the hydraulic suspension system 1000 may provide anti-rolling force by using the anti-rolling principle.

In some embodiments of the present disclosure, as shown in FIG. 1, FIG. 2, FIG. 5, and FIG. 6, a first connection port 2401 is provided on the central control apparatus 24. The height adjustment apparatus includes a shock absorber 200. The shock absorber 200 is arranged in correspondence to the wheel. A liquid storage apparatus is configured to deliver the oil to the shock absorber 200. The first connection port 2401 is communicated with the shock absorber 200. There are a plurality of first connection ports 2401, including a first port 24011, a second port 24012, a third port 24013, and a fourth port 24014. The first port 24011, the second port 24012, the third port 24013, and the fourth port 24014 are respectively communicated with the first chamber 243, the second chamber 244, the third chamber 245, and the fourth chamber 246. Providing the first connection port 2401 implements communication between the plurality of shock absorbers 200 and the central control apparatus 24, and also implements communication between different height adjustment apparatuses and the central control apparatus 24.

In an embodiment, as shown in FIG. 1, FIG. 2, FIG. 5, and FIG. 6, the central control apparatus 24 further includes a second connection port 2402. The second connection port 2402 is configured to communicate the liquid storage apparatus. There are a plurality of second connection ports 2402, including a fifth port 24021, a sixth port 24022, a seventh port 24023, and an eighth port 24024. The fifth port 24021, the sixth port 24022, the seventh port 24023, and the eighth port 24024 are respectively communicated with the first chamber 243, the second chamber 244, the third chamber 245, and the fourth chamber 246. Therefore, the oil in the liquid storage apparatus may enter the height adjustment apparatus through the central control apparatus 24, to implement height adjustment in a non-horizontal state of the vehicle. When the vehicle is in the non-horizontal state, the height adjustment apparatuses are in different states. In this case, when the liquid storage apparatus discharges the oil to each height adjustment apparatus through the central control apparatus, with arrangement of the moving member 241, the oil may be automatically distributed to enter each height adjustment apparatus, without additional calculation of an amount of oil required to be discharged into each height adjustment apparatus based on a status of the vehicle. Therefore, simplicity and convenience are ensured.

Figure 6:
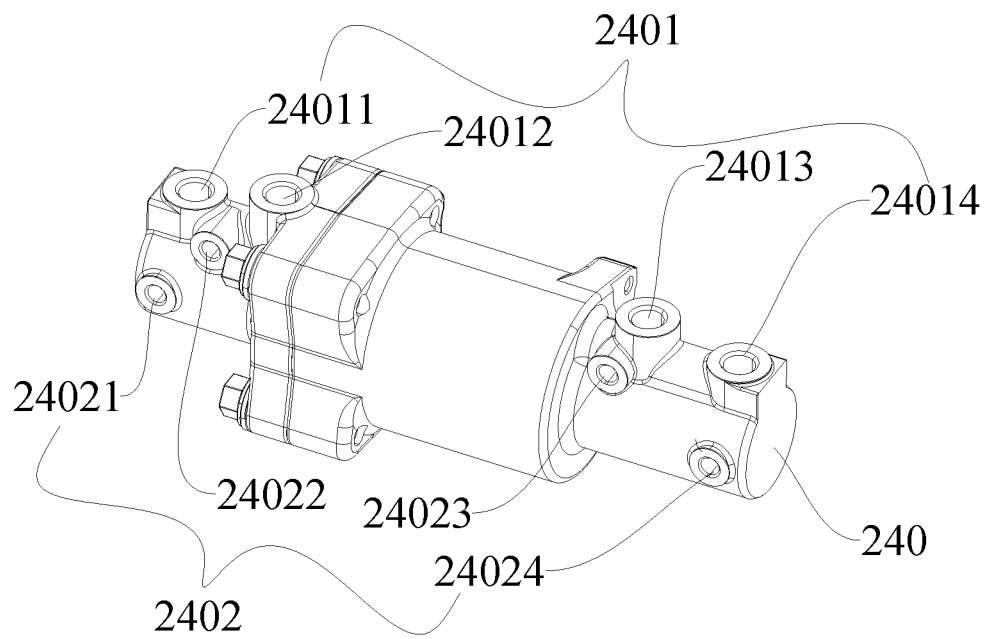
FIG. 6 is a perspective view of a central control apparatus according to an embodiment of the present disclosure.

As shown in FIG. 6, in some examples of the present disclosure, an axis of the first connection port 2401 is perpendicular to that of the second connection port 2402. Therefore, a peripheral space of the central control apparatus 24 may be used appropriately, to make the hydraulic suspension system 1000 more compact.

As shown in FIG. 1 and FIG. 2, in some embodiments of the present disclosure, the hydraulic suspension system 1000 further includes a first control valve 3, a second control valve 4, a third control valve 5, and a fourth control valve 6. The first control valve 3 is arranged between the fifth port 24021 and the liquid storage apparatus. The second control valve 4 is arranged between the sixth port 24022 and the liquid storage apparatus. The third control valve 5 is arranged between the seventh port 24023 and the liquid storage apparatus. The fourth control valve 6 is arranged between the eighth port 24024 and the liquid storage apparatus. Therefore, running statuses of the first control valve 3 to the fourth control valve 6 may be controlled to control the oil in the liquid storage apparatus to enter or not enter the height adjustment apparatus through the central control apparatus.

In an embodiment, a control valve includes the first control valve 3, the second control valve 4, the third control valve 5, and the fourth control valve 6. The control valve is configured to selectively communicate the liquid storage apparatus with one of the second connection port 2402 and the shock absorber. Channel switching in the control valve herein may implement not only direct flowing from the liquid storage apparatus to the height adjustment apparatus but also flowing from the liquid storage apparatus to the height adjustment apparatus through the central control apparatus. Therefore, there is no need to arrange two branches and two valves respectively to implement direct flowing from the liquid storage apparatus to the height adjustment apparatus and flowing from the liquid storage apparatus to the height adjustment apparatus through the central control apparatus.

Certainly, in another embodiment, two branches and two valves may be arranged for implementation.

In some embodiments of the present disclosure, a first connection channel is arranged between the first control valve 3 and the fourth control valve 6. A fifth control valve 7 is arranged on the first connection channel. A second connection channel is arranged between the second control valve 4 and the third control valve 5. A sixth control valve 8 is arranged on the second connection channel.

In an embodiment, when the fifth control valve 7 is opened, the fifth port 24021 is communicated with the eighth port 24024, so that the first chamber 243 is communicated with the fourth chamber 246. When the sixth control valve 8 is opened, the sixth port 24022 is communicated with the seventh port 24023, so that the second chamber 244 is communicated with the third chamber 245. Therefore, the plurality of height adjustment apparatuses are communicated, to maintain the height of the vehicle body.

As shown in FIG. 5 and FIG. 6, in some embodiments of the present disclosure, the moving member 241 includes a first part 2410, a second part 2411, and a third part 2412. The first part 2410 moves axially along a side wall of the housing 240 to divide the housing 240 into the first region and the second region. The second part 2411 is connected to one side (e.g., a first side) of the first part 2410, and moves along the side wall of the housing 240 to divide the first region into the first chamber 243 and the second chamber 244. The third part 2412 is connected to the other side (e.g., a second side) of the first part 2410, and moves along the side wall of the housing 240 to divide the second region into the third chamber 245 and the fourth chamber 246. Therefore, the moving member 241 is simple in structure.

In an embodiment, the housing 240 has a first cylindrical body 2403, a second cylindrical body 2404, and a third cylindrical body 2405 that are arranged in sequence in the moving direction of the moving member 241. An internal diameter of the second cylindrical body 2404 is greater than that of the first cylindrical body 2403 and greater than that of the third cylindrical body 2405. The first chamber 243 is formed between the second part 2411 and an inner wall of the first cylindrical body 2403. The first part 2410 is in contact with an inner wall of the second cylindrical body 2404 to divide the second cylindrical body 2404 into the second chamber 244 and the third chamber 245. The fourth chamber 246 is formed between the third part 2412 and an inner wall of the third cylindrical body 2405. Therefore, the central control apparatus 24 has a simple structure.

In some examples of the present disclosure, an extension direction of the first part 2410 is perpendicular to an extension direction of the second part 2411. The extension direction of the second part 2411 is parallel to that of the third part 2412. Therefore, it is ensured that volumes of the first region and the second region are the same.

In some embodiments of the present disclosure, a restoring spring is arranged between the moving member 241 and an end wall of the housing 240. Therefore, the moving member 241 may be pushed to be restored to the middle position.

In an embodiment, as shown in FIG. 5, the central control apparatus 24 further includes a first restoring spring 247 and a second restoring spring 248. Two ends of the first restoring spring 247 are respectively pressed against the housing 240 and a left end of the moving member 241. Two ends of the second restoring spring 248 are respectively pressed against the housing 240 and a right end of the moving member 241. The first restoring spring 247 and the second restoring spring 248 push the moving member 241 to be restored to the middle. In an embodiment, when the vehicle rolls, and the moving member 241 moves leftward, the first restoring spring 247 may push the moving member 241 rightward to restore the moving member 241. When the vehicle rolls, and the moving member 241 moves rightward, the second restoring spring 248 may push the moving member 241 leftward to restore the moving member 241. Therefore, reliability of the central control apparatus 24 can be ensured.

In some examples of the present disclosure, as shown in FIG. 5, the central control apparatus 24 includes guide components 249. The guide component 249 includes a first guide member 2490 and a second guide member 2491. The first guide member 2490 and the second guide member 2491 are in sliding fit. The first guide member 2490 is fixed to the housing 240. The second guide member 2491 is fixed to the moving member 241. The first restoring spring 247 sheaths the guide component 249 on a left side. The first restoring spring 247 is pressed against the first guide member 2490. The second restoring spring 248 sheaths the guide component 249 on a right side. The second restoring spring 248 is pressed against the first guide member 2490. In this way, arrangement of the guide components 249 not only helps assemble the first restoring spring 247 and the second restoring spring 248, but also helps limit deformation degrees of the first restoring spring 247 and the second restoring spring 248, to avoid a failure of the first restoring spring 247 and the second restoring spring 248 due to excessive deformation.

In an embodiment, the second guide member 2491 is a screw. One end of the second guide member 2491 extends into the first guide member 2490 for moving fit with the first guide member 2490. Therefore, the guide component 249 is simple and reliable in structure.

As shown in FIG. 1 to FIG. 7, the hydraulic suspension system 1000 according to this embodiment of the present disclosure includes the central control apparatus 24, four groups of shock absorber assemblies 2, and a liquid storage apparatus 14. The liquid storage apparatus 14 includes a liquid storage pot 1. The height adjustment apparatuses include the shock absorber assemblies. The plurality of groups of height adjustment apparatuses share the same liquid storage apparatus. Therefore, costs can be reduced, and the hydraulic suspension system 1000 is more compact.

The central control apparatus 24 includes the housing 240 and the moving member 241. The moving member 241 is movably arranged in the housing 240, and is matched with the housing 240 to define the first chamber 243, the second chamber 244, the third chamber 245, and the fourth chamber 246. The first chamber 243, the second chamber 244, the third chamber 245, and the fourth chamber 246 are arranged in sequence in the moving direction of the moving member 241. The first chamber 243 and the second chamber 244 are distributed on one side of the first part 2410 of the moving member 241. The third chamber 245 and the fourth chamber 246 are distributed on the other side of the first part 2410. The first part 2410 is in moving fit with an inner wall of the housing 240.

The four groups of shock absorber assemblies 2 are a left front shock absorber assembly 2, a left rear shock absorber assembly 2, a right front shock absorber assembly 2, and a right rear shock absorber assembly 2. Each group of shock absorber assembly 2 includes the shock absorber 200. The shock absorber 200 includes the shock absorber housing 201, the piston 202, and the piston rod 203. The piston 202 is located in the shock absorber housing 201, and is matched with the shock absorber housing 201 to define an upper chamber 2011 and a lower chamber 2012. The piston rod 203 is arranged on the piston 202. An upper end of the piston rod 203 is configured to be connected to the vehicle body. An oil channel 204 is provided in the piston rod 203. The oil channel 204 is communicated with the lower chamber 2012. It should be noted that in the description of the present disclosure, front is a direction to the front of the vehicle, and rear is a direction to the back of the vehicle. In the direction to the front, a right-hand side of a driver is the right side, and a left-hand side of the driver is the left side.

The oil channel 204 of the left front shock absorber assembly 2 is connected to one of the first chamber 243 and the second chamber 244. The oil channel 204 of the right rear shock absorber assembly 2 is connected to the other of the first chamber 243 and the second chamber 244. The oil channel 204 of the left rear shock absorber assembly 2 is connected to one of the third chamber 245 and the fourth chamber 246. The oil channel 204 of the right front shock absorber assembly 2 is connected to the other of the third chamber 245 and the fourth chamber 246. For ease of description, the following uses an example in which the oil channel 204 of the left front shock absorber assembly 2 is connected to the first chamber 243, the oil channel 204 of the right rear shock absorber assembly 2 is connected to the second chamber 244, the oil channel 204 of the left rear shock absorber assembly 2 is connected to the third chamber 245, and the oil channel 204 of the right front shock absorber assembly 2 is connected to the fourth chamber 246 for principle description.

In an embodiment, when the vehicle has the rolling tendency, for example, the piston rods 203 of the left front shock absorber assembly 2 and the left rear shock absorber assembly 2 are compressed, and the piston rods 203 of the right front shock absorber assembly 2 and the right rear shock absorber assembly 2 are stretched, the oil in the lower chamber 2012 of the left front shock absorber assembly 2 is discharged to the first chamber 243 through the oil channel 204, and the oil in the lower chamber 2012 of the left rear shock absorber assembly 2 is discharged to the third chamber 245 through the oil channel 204. Since the first chamber 243 and the third chamber 245 are located on two sides of the first part 2410, a direction of acting force of the oil in the first chamber 243 on the first part 2410 is opposite to that of acting force of the third chamber 245 on the first part 2410. The two pieces of acting force in opposite directions interact, so that the moving member 241 does not move. Therefore, movements of the piston rod 203 of the left front shock absorber assembly 2 and the piston rod 203 of the left rear shock absorber assembly 2 can be inhibited, to inhibit rolling.

When the left front wheel of the vehicle encounters an obstacle, for example, a stone, the left front wheel is lifted up, and a compression degree of the left front shock absorber assembly 2 is greater than that of the left rear shock absorber assembly 2, an amount of oil discharged from the left front shock absorber assembly 2 to the first chamber 243 is greater than that of oil discharged from the left rear shock absorber assembly 2 to the third chamber 245. Therefore, the moving member 241 moves rightward to squeeze the third chamber 245 and the fourth chamber 246, the oil in the third chamber 245 may be discharged into the lower chamber 2012 of the left rear shock absorber assembly 2 to move the piston rod 203 upward, and the oil in the fourth chamber 246 may be discharged into the lower chamber 2012 of the right front shock absorber assembly 2 to move the piston rod 203 upward. Therefore, a possibility that the left rear wheel and the right front wheel get off the ground is reduced, and the stability of the vehicle is improved.

Certainly, it can be understood that the foregoing cases are merely examples for description. When the vehicle encounters another working condition, for example, the right front wheel is lifted up, or the left rear wheel is lifted up, the oil flows according to the foregoing linkage principle, to improve the stability of the vehicle. Details under each working condition are not described herein.

According to the hydraulic suspension system 1000 in this embodiment of the present disclosure, with arrangement of the central control apparatus 24 and the four groups of shock absorber assemblies, each group of shock absorber assembly 2 being provided with the oil channel 204, when the vehicle has the rolling tendency, rolling can be inhibited. When four tires of the vehicle are at inconsistent heights, the height of the vehicle body may be adjusted to reduce the inclination magnitude of the vehicle, to avoid the vehicle being inclined.

As shown in FIG. 1 and FIG. 2, the liquid storage pot 1 is connected to the central control apparatus through third connection channels. The first control valve 3 to the fourth control valve 6 are arranged on corresponding third connection channels to connect or disconnect the corresponding third connection channels. That is, when the control valves corresponding to the groups of shock absorber assemblies 2 disconnect the corresponding third connection channels, flow channels between the liquid storage pot 1 and the corresponding first chamber, second chamber, third chamber, and fourth chamber of the central control apparatus are disconnected, and the oil in the liquid storage pot 1 does not flow into the corresponding central control apparatus.

In an embodiment, the hydraulic suspension system 1000 has a lifting mode and a lowering mode. In the lifting mode, the oil may enter the oil channel 204 of the left front shock absorber assembly 2, the oil channel 204 of the right front shock absorber assembly 2, the oil channel 204 of the left rear shock absorber assembly 2, and the oil channel 204 of the right rear shock absorber assembly 2. The hydraulic oil entering each oil channel 204 flows into the lower chamber 2012, so that hydraulic pressure in the lower chamber 2012 increases, and the piston 202 moves upward. The upward movement of the piston 202 drives the piston rod 203 to move upward. The piston rod 203 of the left front shock absorber assembly 2 moves upward, the piston rod 203 of the right front shock absorber assembly 2 moves upward, the piston rod 203 of the left rear shock absorber assembly 2 moves upward, and the piston rod 203 of the right rear shock absorber assembly 2 moves upward, to drive the vehicle body to move upward. In this way, the vehicle body is lifted.

In the lowering mode, the oil may flow from the oil channel 204 of the left front shock absorber assembly 2, the oil channel 204 of the right front shock absorber assembly 2, the oil channel 204 of the left rear shock absorber assembly 2, and the oil channel 204 of the right rear shock absorber assembly 2 to the liquid storage pot 1. Hydraulic pressure in the lower chamber 2012 of each shock absorber 200 decreases, so that the piston 202 moves downward. The downward movement of the piston 202 drives the piston rod 203 to move downward. The piston rod 203 of the left front shock absorber assembly 2 moves downward, the piston rod 203 of the right front shock absorber assembly 2 moves downward, the piston rod 203 of the left rear shock absorber assembly 2 moves downward, and the piston rod 203 of the right rear shock absorber assembly 2 moves downward, to drive the vehicle body to move downward. In this way, the vehicle body is lowered.

There may be various road conditions in a running process of the vehicle. In the related art, once a suspension system of a vehicle is selected, the suspension system cannot be adjusted in a running process of the vehicle. As a result, a conventional suspension can only ensure optimal performance matching of the vehicle under a road and speed condition, and can only passively bear acting force of the ground on a vehicle body, a suspension parameter cannot be changed based on different roads and speeds, and the acting force of the ground on the vehicle body cannot be actively controlled.

The hydraulic suspension system 1000 according to this embodiment of the present disclosure may adjust the height of the vehicle body based on a road condition. For example, when the vehicle runs on a rough mountain road, the lifting mode may be entered, to rise a center of mass of the vehicle and improve the running stability of the vehicle. When impact of the vehicle body on a running speed is required to be reduced, the lowering mode may be entered, to lower the center of mass of the vehicle. Certainly, it can be understood that the above is merely example description, and the height of the vehicle body can also be adjusted based on an actual need in the running process.

The hydraulic suspension system 1000 according to this embodiment of the present disclosure may adjust the height of the vehicle body, to improve the handling stability of the vehicle without damaging comfort of the vehicle, which effectively resolves a conflict between the comfort and the handling stability of the vehicle. In addition, using the hollow piston rod 203 can reduce the weight. Moreover, the oil flows in or out through the oil channel 204 defined by the hollow piston rod 203, to adjust a position of the piston rod 203. This adjustment manner is simple, high in reliability, low in cost, and quick in response.

As shown in FIG. 1 and FIG. 2, in some embodiments of the present disclosure, the liquid storage pot 1 has a liquid outlet and a liquid inlet. The liquid storage apparatus further includes a control pump 26 and an oil return valve 27. The control pump 26 is separately connected to the liquid outlet and the third connection channel to guide the oil in the liquid storage pot 1 to the third connection channel. The oil return valve 27 is separately connected to the liquid inlet and the third connection channel. When the oil return valve 27 is opened, the oil flows from the third connection channel to the liquid inlet. That is, the liquid storage pot 1 has a liquid return channel and a liquid outlet channel that are independent. When liquid is required to be discharged, the control pump 26 is started, the oil return valve 27 is closed, and the control pump 26 guides the oil to each group of shock absorber assembly 2. When liquid is required to be returned, the control pump 26 is stopped, the oil return valve 27 is opened, and the oil flowing out of each group of shock absorber assembly 2 may flow to the liquid storage pot 1 through the oil return valve 27. Therefore, arrangement of the two independent channels ensures liquid discharge and liquid return reliability.

In some examples of the present disclosure, as shown in FIG. 1 and FIG. 2, the control pump 26 includes a control valve body 260 and a drive motor 261. The drive motor 261 is electrically connected to a valve in the control valve body 260. The drive motor 261 rotates to control the valve to rotate, to start or stop the control pump 26. Therefore, starting or stopping the control pump 26 in a manner of matching the drive motor 261 with the valve can ensure reliable running of the control pump 26 and reduce impact of the oil on starting or stopping of the control pump 26.

In an embodiment, as shown in FIG. 1 and FIG. 2, the hydraulic suspension system 1000 further includes a one-way valve 28. The one-way valve 28 is arranged at an outlet end of the control pump 26 to implement one-way connection. Therefore, when liquid is returned, existence of the one-way valve 28 can effectively avoid the oil flowing to the control pump 26, to avoid the oil flowing to the liquid outlet through the control pump 26 in case of an accident of the control pump 26.

In some embodiments of the present disclosure, as shown in FIG. 1 and FIG. 2, the hydraulic suspension system 1000 further includes a pressure maintaining accumulator 29. The pressure maintaining accumulator 29 is arranged at the outlet end of the control pump 26. Therefore, the pressure maintaining accumulator 29 can maintain pressure and eliminate a flow fluctuation at the outlet end of the control pump 26.

Figure 7:
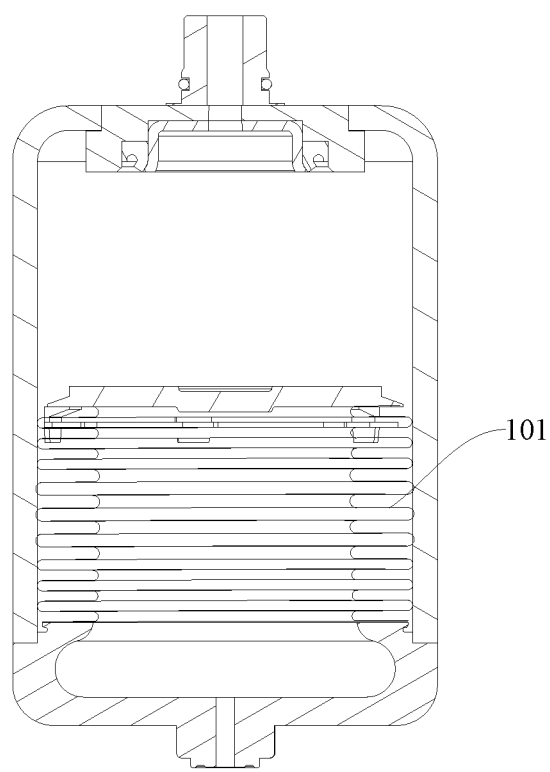
FIG. 7 is a schematic diagram of a metal corrugated pipe accumulator according to an embodiment of the present disclosure.

In some examples of the present disclosure, the pressure maintaining accumulator 29 may be a metal corrugated pipe accumulator. As shown in FIG. 7, the metal corrugated pipe accumulator includes a cylindrical body assembly and a corrugated pipe assembly. The cylindrical body assembly includes an upper cover, a sealing ring, a cylinder tube, a snap ring, and a seal ring. The corrugated pipe assembly includes a sealing cover, a guide ring, a corrugated pipe, and a lower cover. The metal corrugated pipe accumulator may replace an airbag or a diaphragm. A metal corrugated pipe 101 is used as a flexible separation element between a fluid and a gas. The corrugated pipe may be used in a wide temperature range. The metal corrugated pipe is welded to another component, so that complete air tightness is ensured. The metal corrugated pipe can move up and down inside the accumulator without any friction or abrasion, and can run for a long time after adjusted once.

In some embodiments of the present disclosure, as shown in FIG. 1 and FIG. 2, the hydraulic suspension system 1000 further includes a pressure relief valve 31. The pressure relief valve 31 is located at the outlet end of the control pump 26. When pressure at the liquid outlet of the control pump 26 reaches a threshold, the pressure relief valve 31 is opened to release pressure, to protect the hydraulic suspension system 1000 in a normal pressure range. It should be noted that a working principle of the pressure relief valve 31 is a related art, and details about the working principle are not described herein.

As shown in FIG. 1 and FIG. 2, in some embodiments of the present disclosure, the hydraulic suspension system 1000 further includes the first connection channel and the second connection channel. The first connection channel is separately connected to the oil channel 204 of the left front shock absorber assembly 2 and the oil channel 204 of the right front shock absorber assembly 2. The fifth control valve 7 configured to connect or disconnect the first connection channel is arranged on the first connection channel.

The second connection channel is separately connected to the oil channel 204 of the left rear shock absorber assembly 2 and the oil channel 204 of the right rear shock absorber assembly 2. The sixth control valve 8 configured to connect or disconnect the second connection channel is arranged on the second connection channel.

In an embodiment, when the fifth control valve 7 is opened, the first connection channel is connected. When the fifth control valve 7 is closed, the first connection channel is disconnected. When the sixth control valve 8 is opened, the second connection channel is connected. When the sixth control valve 8 is closed, the second connection channel is disconnected.

When the height of the vehicle body is required to be maintained, the hydraulic suspension system 1000 may be switched to a height maintaining mode. Both the fifth control valve 7 and the sixth control valve 8 are opened. The first connection channel and the second connection channel are connected. The oil channel 204 of the left front shock absorber assembly 2 and the oil channel 204 of the right front shock absorber assembly 2 are connected. The oil channel 204 of the left rear shock absorber assembly 2 and the oil channel 204 of the left rear shock absorber assembly 2 are connected. That is, the piston rod 203 of the left front shock absorber assembly 2 is linked with the piston rod 203 of the right front shock absorber assembly 2, and the piston rod 203 of the left rear shock absorber assembly 2 is linked with the piston rod 203 of the left rear shock absorber assembly 2. Therefore, a current height of the vehicle body can be maintained as much as possible.

In some embodiments of the present disclosure, as shown in FIG. 1 and FIG. 2, the height adjustment apparatus further includes a connection channel and an accumulator module. The connection channel is connected between the central control apparatus and the corresponding shock absorber. The accumulator module includes a damping adjustment accumulator 9 and an opening adjustment valve 80. The damping adjustment accumulator 9 is connected between the shock absorber and the central control apparatus. The opening adjustment valve 80 is arranged between the damping adjustment accumulator 9 and the shock absorber. An oil flow in a connection channel may be adjusted to adjust damping of the corresponding connection channel, to adjust damping of the hydraulic suspension system 1000. Therefore, the damping of the hydraulic suspension system 1000 can be adjusted based on an actual situation, for example, can be adjusted based on a road condition, to ensure that the damping of the hydraulic suspension system 1000 can meet a shock absorption requirement. This effectively resolves a conflict between the comfort and the handling stability of the vehicle. In some examples of the present disclosure, the opening adjustment valve 80 includes a first motor and a first valve body. The first motor may control a movement of a valve in the first valve body, to change a circulation area of the first valve body to implement flow adjustment.

When an opening of the opening adjustment valve 80 decreases, and an amount of oil that may flow through the connection channel decreases, a flow channel through which oil in the shock absorber enters the connection channel is narrowed, and damping of the shock absorber increases. When the opening of the opening adjustment valve 80 increases, the flow channel through which the shock absorber enters the connection channel is widened, and the damping of the shock absorber decreases. Therefore, the damping adjustment accumulator 9 is matched with the opening adjustment valve 80 to ensure reliability in adjusting the damping of the hydraulic suspension system 1000 and ensure that an amount of oil flowing in the connection channel is matched with required damping.

In some embodiments of the present disclosure, as shown in FIG. 1 and FIG. 2, the accumulator module includes a stiffness adjustment accumulator 10. One stiffness adjustment accumulator 10 is arranged in correspondence to each group of shock absorber assembly 2. The stiffness adjustment accumulator 10 is connected to the connection channel at a stiffness adjustment connection point. A stiffness adjustment valve 11 is arranged between the stiffness adjustment accumulator 10 and the stiffness adjustment connection point. The oil in the liquid storage pot 1 may enter the stiffness adjustment accumulator 10 for accumulation. When stiffness is required to be improved, the first control valve 3 to the fourth control valve 6 are all closed, and the stiffness adjustment valve 11 is closed. In this way, the stiffness adjustment accumulator 10 is disconnected from the corresponding shock absorber 200. Therefore, suspension stiffness is improved.

It can be understood that each stiffness adjustment valve 11 is independently adjustable, so that a front side and a rear side of the hydraulic suspension system 1000 may have different stiffness, to meet requirements under different working conditions. For example, since the front axle is required to provide high stiffness under an anti-nodding working condition and an anti-rolling turning working condition of the vehicle, the stiffness adjustment valves 11 corresponding to the left front shock absorber assembly 2 and the right front shock absorber assembly 2 may be closed, and the stiffness adjustment valves 11 corresponding to the right rear shock absorber assembly 2 and the left rear shock absorber assembly 2 are opened.

In some examples of the present disclosure, the damping adjustment accumulator 9 is a metal corrugated pipe accumulator, and the stiffness adjustment accumulator 10 is a diaphragm accumulator. Compared with the metal corrugated pipe accumulator, the diaphragm accumulator can accumulate more pressure faster. The diaphragm accumulator can accumulate more pressure within a short time. Therefore, the diaphragm accumulator is used as the stiffness adjustment accumulator 10 to accumulate pressure of each suspension, to lift the vehicle body. It should be noted that accumulation principles of the metal corrugated pipe accumulator and the diaphragm accumulator are related arts, and details are not described herein.

In some embodiments of the present disclosure, as shown in FIG. 1, the height adjustment apparatus further includes a seventh control valve 12. The seventh control valve 12 is arranged between the stiffness adjustment connection point and the damping adjustment accumulator 9. In an embodiment, the hydraulic suspension system 1000 may have a boost mode. In the boost mode, the first control valve 3 to the fourth control valve 6 are all opened, the seventh control valve 12 is closed, the stiffness adjustment valve 11 is opened, and the oil in the liquid storage pot 1 enters the stiffness adjustment accumulator 10 for accumulation.

When the hydraulic suspension system is required to be switched to the lifting mode, the first control valve 3 to the fourth control valve 6 are all closed, the seventh control valve 12 is opened, the stiffness adjustment valve 11 is opened, and the oil in the stiffness adjustment accumulator 10 enters the oil channel 204 to lift the piston 202. When the hydraulic suspension system is required to be switched to the lowering mode, the first control valve 3 to the fourth control valve 6 are all opened, the seventh control valve 12 is opened, the stiffness adjustment valve 11 is closed, and the oil discharged from the oil channel 204 of the shock absorber 200 flows back into the liquid storage pot 1. Therefore, with arrangement of the seventh control valve 12, accumulation may be first performed on the stiffness adjustment valve 11, and when lifting or stiffness adjustment is required, the stiffness adjustment valve 11 may be opened or closed to implement lifting or stiffness adjustment reliably with a quick response.

In an embodiment, the hydraulic suspension system 1000 may further have an anti-nodding braking mode and an anti-nodding acceleration mode. In the running process of the vehicle, one of the first control valve 3 to the fourth control valve 6 that correspond to the groups of shock absorber assemblies 2 may be controlled to be closed, the seventh control valve 12 is opened, the stiffness adjustment valve 11 is closed, the oil channel 204 of each group of shock absorber assembly 2 is communicated with the damping adjustment accumulator 9, and the damping adjustment accumulator 9 may adjust an amount of oil in the corresponding shock absorber 200. Therefore, the shock absorber 200 corresponding to each group of shock absorber assembly 2 has reacting force for a motion trend of the vehicle body at a corresponding position, which endows the hydraulic suspension system 1000 with the anti-nodding braking mode and the anti-nodding acceleration mode.

As shown in FIG. 2, in some embodiments of the present disclosure, the liquid storage apparatus further includes a central accumulator 13. The first control valve 3 to the fourth control valve 6 that correspond to the plurality of groups of shock absorber assemblies 2 are all connected to the central accumulator 13. That is, when the first control valve 3 to the fourth control valve 6 are all closed, the oil in the liquid storage pot 1 can enter the central accumulator 13 for accumulation. When the first control valve 3 to the fourth control valve 6 are all opened, the oil in the central accumulator 13 can flow into the oil channel 204 of each group of shock absorber assembly 2. Therefore, with arrangement of the central accumulator 13, boosting accumulation may be first performed, to ensure that the oil can reliably flow to each group of shock absorber assembly 2 to facilitate further adjustment of a damping system and a stiffness coefficient of the hydraulic suspension system 1000. As shown in FIG. 2, in the lifting mode, the oil in the central accumulator 13 may be discharged into each oil channel 204.

As shown in FIG. 1 and FIG. 2, in some embodiments of the present disclosure, one pressure reduction accumulator 30 is arranged in correspondence to each shock absorber assembly 2. Each pressure reduction accumulator 30 is communicated with the corresponding oil channel 204. Therefore, in the running process of the vehicle, in a case in which the vehicle is subjected to damping impact, or the like, the oil in the lower chamber 2012 of each shock absorber assembly 2 may enter the pressure reduction accumulator 30 through the oil channel 204 for accumulation, to quickly reduce pressure.

As shown in FIG. 1 to FIG. 4, in some embodiments of the present disclosure, each group of shock absorber assembly 2 includes a shock absorption spring 205. Two ends of the shock absorption spring 205 are configured to be connected to the vehicle body and the axle. Therefore, with arrangement of the shock absorption spring 205, damping effects of each group of shock absorber assembly 2 can be improved, and bumping of the vehicle body in the running process of the vehicle can be reduced.

In an embodiment, as shown in FIG. 1 to FIG. 4, the shock absorption spring 205 of the left front shock absorber assembly 2 is fixed to the shock absorber 200 in a sheathing manner. The shock absorption spring 205 of the right front shock absorber assembly 2 is fixed to the shock absorber 200 in the sheathing manner. The shock absorption spring 205 and the shock absorber 200 of the left rear shock absorber assembly 2 are arranged side by side. The shock absorption spring 205 and the shock absorber 200 of the right rear shock absorber assembly 2 are arranged side by side.

The following describes in detail the hydraulic suspension system 1000 according to two embodiments of the present disclosure with reference to FIG. 1 and FIG. 2. It can be understood that each of the foregoing embodiments is described merely as an example rather than a limitation, and each embodiment may be modified based on an actual situation.

Embodiment 1

As shown in FIG. 1, the hydraulic suspension system 1000 according to this embodiment of the present disclosure includes the left front shock absorber assembly 2, the right front shock absorber assembly 2, the left rear shock absorber assembly 2, the right rear shock absorber assembly 2, the liquid storage pot 1, the control pump 26, the oil return valve 27, the one-way valve 28, the pressure maintaining accumulator 29, the pressure relief valve 31, opening adjustment valves 80, damping adjustment accumulators 9, stiffness adjustment accumulators 10, pressure reduction accumulators 30, the central control apparatus 24, the first connection channel, and the second connection channel.

The left front shock absorber assembly 2 and the right front shock absorber assembly 2 each include the shock absorber 200 and the shock absorption spring 205, and the shock absorption spring 205 is fixed to the shock absorber 200 in a sheathing manner. The left rear shock absorber assembly 2 and the right rear shock absorber assembly 2 each include the shock absorber 200 and the shock absorption spring 205, and the shock absorption spring 205 and the shock absorber 200 are arranged side by side. Two ends of the shock absorption spring 205 of the left rear shock absorber assembly 2 are respectively connected to the vehicle body and the axle. Two ends of the shock absorption spring 205 of the right rear shock absorber assembly 2 are respectively connected to the vehicle body and the axle. Each shock absorber 200 includes the shock absorber housing 201, the piston rod 203, and the piston 202. The piston rod 203 is connected to the piston 202. The piston 202 is movably arranged in the shock absorber housing 201 to define the upper chamber 2011 and the lower chamber 2012. The oil channel 204 is provided in the piston rod 203. The oil channel 204 is communicated with the lower chamber 2012. The central control apparatus is connected to the liquid storage pot 1 through the third connection channels. The first control valve 3 to the fourth control valve 6 are arranged on the corresponding third connection channels.

The liquid storage pot 1 has the liquid outlet and the liquid inlet. The control pump 26 is separately connected to the liquid outlet and the third connection channel to guide the oil in the liquid storage pot 1 to the third connection channel. The oil return valve 27 is separately connected to the liquid inlet and the third connection channel. When the oil return valve 27 is opened, the oil flows from the third connection channel to the liquid inlet. The one-way valve 28 is arranged at the outlet end of the control pump 26 to implement one-way connection. The pressure maintaining accumulator 29 is arranged at the outlet end of the control pump 26, and is located between the one-way valve 28 and the control pump 26. The pressure maintaining accumulator 29 can maintain pressure and eliminate the flow fluctuation at the outlet end of the control pump 26.

The hydraulic suspension system 1000 includes a common flow channel and four branch flow channels. The four branch flow channels are respectively connected to the oil channels 204 of the four groups of shock absorber assemblies 2. The one-way valve 28 and the oil return valve 27 are connected to the common flow channel. The pressure relief valve 31 is connected to the common flow channel.

The first control valve 3 to the fourth control valve 6 are respectively connected in series to the four branch flow channels in one-to-one correspondence. The first control valve 3 to the fourth control valve 6 are separately configured to control the corresponding branch flow channels to be connected or disconnected.

The stiffness adjustment accumulator 10 corresponding to each shock absorber assembly 2 is connected to the corresponding branch flow channel. The stiffness adjustment valve 11 is arranged at an oil inlet/outlet of the stiffness adjustment accumulator 10. The stiffness adjustment valve 11 is normally closed.

The opening adjustment valve 80, the damping adjustment accumulator 9, and the seventh control valve 12 are further arranged on each branch flow channel. The opening adjustment valve 80 is configured to adjust a flow that flows through the corresponding branch flow channel to adjust the damping of the hydraulic suspension system 1000. The damping adjustment accumulator 9 may perform accumulation. The seventh control valve 12 is arranged between the damping adjustment accumulator 9 and the stiffness adjustment accumulator 10.

One pressure reduction accumulator 30 is arranged in correspondence to each shock absorber assembly 2. The pressure reduction accumulator 30 corresponding to the left front shock absorber assembly 2 is directly connected to the piston rod 203 to be communicated with the corresponding oil channel 204. The pressure reduction accumulator 30 corresponding to the right front shock absorber assembly 2 is directly connected to the piston rod 203 to be communicated with the corresponding oil channel 204. The pressure reduction accumulator 30 corresponding to the left rear shock absorber assembly 2 is connected to the corresponding branch flow channel. The pressure reduction accumulator 30 corresponding to the right rear shock absorber assembly 2 is directly connected to the corresponding branch flow channel.

In an embodiment, the hydraulic suspension system 1000 has the boost mode, the lifting mode, and the lowering mode. In the boost mode, the first control valve 3 to the fourth control valve 6 are all opened, the seventh control valve 12 is closed, the stiffness adjustment valve 11 is opened, and the control pump 26 runs to enable the oil in the liquid storage pot 1 to flow into the corresponding stiffness adjustment accumulators 10 through the four branch flow channels for accumulation. After accumulation of each stiffness adjustment accumulator 10, the stiffness adjustment valve 11 is closed.

In the lifting mode, the oil in the liquid storage pot 1 may enter the oil channel 204 of the left front shock absorber assembly 2, the oil channel 204 of the right front shock absorber assembly 2, the oil channel 204 of the left rear shock absorber assembly 2, and the oil channel 204 of the right rear shock absorber assembly 2. The hydraulic oil entering each oil channel 204 flows into the lower chamber 2012, so that hydraulic pressure in the lower chamber 2012 increases, and the piston 202 moves upward. The upward movement of the piston 202 drives the piston rod 203 to move upward. The piston rod 203 of the left front shock absorber assembly 2 moves upward, the piston rod 203 of the right front shock absorber assembly 2 moves upward, the piston rod 203 of the left rear shock absorber assembly 2 moves upward, and the piston rod 203 of the right rear shock absorber assembly 2 moves upward, to drive the vehicle body to move upward. In this way, the vehicle body is lifted.

In the lowering mode, the oil may flow out of the oil channel 204 of the left front shock absorber assembly 2, the oil channel 204 of the right front shock absorber assembly 2, the oil channel 204 of the left rear shock absorber assembly 2, and the oil channel 204 of the right rear shock absorber assembly 2. Hydraulic pressure in the lower chamber 2012 of each shock absorber 200 decreases, so that the piston 202 moves downward. The downward movement of the piston 202 drives the piston rod 203 to move downward. The piston rod 203 of the left front shock absorber assembly 2 moves downward, the piston rod 203 of the right front shock absorber assembly 2 moves downward, the piston rod 203 of the left rear shock absorber assembly 2 moves downward, and the piston rod 203 of the right rear shock absorber assembly 2 moves downward, to drive the vehicle body to move downward. In this way, the vehicle body is lowered. It can be understood that in the lowering mode, the oil discharged from each group of shock absorber assembly 2 can be directly discharged to the liquid storage pot 1, may be discharged to an accumulator assembly for accumulation, or is discharged to both the liquid storage pot 1 and an accumulator assembly.

When pressure in the hydraulic suspension system 1000 is high, for example, it is detected that pressure at an outlet of the control pump 26 reaches a threshold (e.g., 30 MPa), the oil return valve 27 is opened to release pressure to protect the hydraulic suspension system 1000 in a normal pressure range. In this case, the oil in each shock absorber 200 may flow into the liquid storage pot 1.

If the pressure in the hydraulic suspension system 1000 is still high after pressure relief, or pressure is high in the running process, the pressure relief valve 31 may be opened to release pressure, to ensure reliable operation of the entire hydraulic suspension system 1000.

In the running process of the vehicle, high damping of the hydraulic suspension system 1000 may cause bumping of the vehicle body, affecting the comfort. In this case, an amount of oil in each branch flow channel may be adjusted through the opening adjustment valve 80, to adjust the damping of the hydraulic suspension system 1000. When an opening of the opening adjustment valve 80 decreases, a flow channel through which the shock absorber enters the connection channel is narrowed, and the damping of the shock absorber increases. When an opening of the opening adjustment valve 80 increases, a flow channel through which the shock absorber enters the connection channel is widened, and the damping of the shock absorber decreases. Therefore, the damping of the hydraulic suspension system 1000 can be reliably adjusted.

When the comfort of the vehicle is reduced by high stiffness of the hydraulic suspension system 1000, the stiffness adjustment valve 11 may be controlled to be opened, and the oil in the stiffness adjustment accumulator 10 may flow into each branch flow channel as a supplement. Therefore, the stiffness of the hydraulic suspension system 1000 can be reduced, and buffering effects of the hydraulic suspension system 1000 for bumping can be improved.

In the running process of the vehicle, in a case in which the vehicle is subjected to damping impact, or the like, the oil in the lower chamber 2012 of each shock absorber assembly 2 may enter the pressure reduction accumulator 30 through the oil channel 204 for accumulation, to quickly reduce pressure. Since the front axle of the vehicle needs to ensure running stability, and the rear axle of the vehicle mainly needs to ensure the comfort, the pressure reduction accumulator 30 corresponding to the left front shock absorber assembly 2 is directly connected to the piston rod 203 to be communicated with the corresponding oil channel 204, and the pressure reduction accumulator 30 corresponding to the right front shock absorber assembly 2 is directly connected to the piston rod 203 to be communicated with the corresponding oil channel 204, to quickly release the pressure.

The central control apparatus 24 includes the housing 240 and the moving member 241. The moving member 241 is movably arranged in the housing 240, and is matched with the housing 240 to define the first chamber 243, the second chamber 244, the third chamber 245, and the fourth chamber 246. The first chamber 243, the second chamber 244, the third chamber 245, and the fourth chamber 246 are arranged in sequence in the moving direction of the moving member 241. The first chamber 243 and the second chamber 244 are distributed on one side of the first part 2410 of the moving member 241. The third chamber 245 and the fourth chamber 246 are distributed on the other side of the first part 2410. The first part 2410 is in moving fit with an inner wall of the housing 240.

The oil channel 204 of the left front shock absorber assembly 2 is connected to one of the first chamber 243 and the second chamber 244. The oil channel 204 of the right rear shock absorber assembly 2 is connected to the other of the first chamber 243 and the second chamber 244. The oil channel 204 of the left rear shock absorber assembly 2 is connected to one of the third chamber 245 and the fourth chamber 246. The oil channel 204 of the right front shock absorber assembly 2 is connected to the other of the third chamber 245 and the fourth chamber 246. For ease of description, the following uses an example in which the oil channel 204 of the left front shock absorber assembly 2 is connected to the first chamber 243, the oil channel 204 of the right rear shock absorber assembly 2 is connected to the second chamber 244, the oil channel 204 of the left rear shock absorber assembly 2 is connected to the third chamber 245, and the oil channel 204 of the right front shock absorber assembly 2 is connected to the fourth chamber 246 for principle description.

In an embodiment, when the vehicle has the rolling tendency, for example, the piston rods 203 of the left front shock absorber assembly 2 and the left rear shock absorber assembly 2 are compressed, and the piston rods 203 of the right front shock absorber assembly 2 and the right rear shock absorber assembly 2 are stretched, the oil in the lower chamber 2012 of the left front shock absorber assembly 2 is discharged to the first chamber 243 through the oil channel 204, and the oil in the lower chamber 2012 of the left rear shock absorber assembly 2 is discharged to the third chamber 245 through the oil channel 204. Since the first chamber 243 and the third chamber 245 are located on two sides of the first part 2410, a direction of acting force of the oil in the first chamber 243 on the first part 2410 is opposite to that of acting force of the third chamber 245 on the first part 2410. The two pieces of acting force in opposite directions interact, so that the moving member 241 does not move. Therefore, movements of the piston rod 203 of the left front shock absorber assembly 2 and the piston rod 203 of the left rear shock absorber assembly 2 can be inhibited, to inhibit rolling.

When the left front wheel of the vehicle encounters an obstacle, for example, a stone, the left front wheel is lifted up, and a compression degree of the left front shock absorber assembly 2 is greater than that of the left rear shock absorber assembly 2, an amount of oil discharged from the left front shock absorber assembly 2 to the first chamber 243 is greater than that of oil discharged from the left rear shock absorber assembly 2 to the third chamber 245. Therefore, the moving member 241 moves rightward to squeeze the third chamber 245 and the fourth chamber 246, the oil in the third chamber 245 may be discharged into the lower chamber 2012 of the left rear shock absorber assembly 2 to move the piston rod 203 upward, and the oil in the fourth chamber 246 may be discharged into the lower chamber 2012 of the right front shock absorber assembly 2 to move the piston rod 203 upward. Therefore, the distance between the right front wheel and the vehicle body and the distance between the left rear wheel and the vehicle body are increased, an inclination magnitude of the vehicle is reduced, and the vehicle is avoided from rolling.

Certainly, it can be understood that the foregoing cases are merely examples for description. When the vehicle encounters another working condition, for example, the right front wheel is lifted up, or the left rear wheel is lifted up, the oil flows according to the foregoing linkage principle, to avoid the vehicle rolling. Details under each working condition are not described herein.

The first connection channel is separately connected to the oil channel 204 of the left front shock absorber assembly 2 and the oil channel 204 of the right front shock absorber assembly 2. The fifth control valve 7 configured to connect or disconnect the first connection channel is arranged on the first connection channel.

The second connection channel is separately connected to the oil channel 204 of the left rear shock absorber assembly 2 and the oil channel 204 of the right rear shock absorber assembly 2. The sixth control valve 8 configured to connect or disconnect the second connection channel is arranged on the second connection channel.

In an embodiment, when the fifth control valve 7 is opened, the first connection channel is connected. When the fifth control valve 7 is closed, the first connection channel is disconnected. When the sixth control valve 8 is opened, the second connection channel is connected. When the sixth control valve 8 is closed, the second connection channel is disconnected.

When the height of the vehicle body is required to be maintained, the hydraulic suspension system 1000 may be switched to the height maintaining mode. Both the fifth control valve 7 and the sixth control valve 8 are opened. The first connection channel and the second connection channel are connected. The oil channel 204 of the left front shock absorber assembly 2 and the oil channel 204 of the right front shock absorber assembly 2 are connected. The oil channel 204 of the left rear shock absorber assembly 2 and the oil channel 204 of the left rear shock absorber assembly 2 are connected. That is, the piston rod 203 of the left front shock absorber assembly 2 is linked with the piston rod 203 of the right front shock absorber assembly 2, and the piston rod 203 of the left rear shock absorber assembly 2 is linked with the piston rod 203 of the left rear shock absorber assembly 2. Therefore, the current height of the vehicle body can be maintained as much as possible.

Embodiment 2

As shown in FIG. 2, in this embodiment, compared with Embodiment 1, the hydraulic suspension system 1000 according to this embodiment of the present disclosure is not provided with the seventh control valve 12, and the hydraulic suspension system 1000 includes the central accumulator 13.

It should be noted that in this embodiment, in the boost mode, the oil in the liquid storage pot 1 flows to the central accumulator 13 and the stiffness adjustment accumulator 10 for accumulation.

The hydraulic suspension system 1000 according to this embodiment has same modes as those in Embodiment 1, and descriptions are omitted herein.

A vehicle according to an embodiment of the present disclosure includes the hydraulic suspension system 1000 according to any one of the foregoing embodiments.

In the vehicle according to this embodiment of the present disclosure, with arrangement of the central control apparatus 24 and the plurality of height adjustment apparatuses, when the vehicle has a rolling tendency, rolling can be inhibited. When four wheels of the vehicle are at inconsistent heights, a height of a vehicle body may be adjusted to reduce an inclination magnitude of the vehicle, to avoid the vehicle rolling.

In the description of the present disclosure, it should be understood that an orientation or positional relationship indicated by the term "center", "longitudinal", "transverse", "length", "width", "thickness", "upper", "lower", "front", "back", "left", "right", "vertical", "horizontal", "top", "bottom", "internal", "external", "clockwise", "counterclockwise", "axial direction", "radial direction", "circumferential direction", or the like is based on an orientation or positional relationship shown in the accompanying drawings, and is merely for ease of describing the present disclosure and simplifying the description, but does not indicate or imply that an apparatus or an element mentioned needs to have an orientation or be constructed and operated in an orientation, and therefore cannot be understood as a limitation on the present disclosure.

In addition, the terms "first" and "second" are merely for a purpose of description, and shall not be understood as an indication or implication of relative importance or an implicit indication of the quantity of indicated technical features. Therefore, a feature limited by "first" or "second" may explicitly or implicitly include one or more such features. In the description of the present disclosure, "a plurality of" means two or more, unless otherwise definitely and limited.

In the present disclosure, unless otherwise explicitly specified and limited, the terms such as "mount", "connected to each other", "connect", and "fix" should be understood in a broad sense. For example, a connection may be a fixed connection, a detachable connection, or an integral connection, may be a mechanical connection or an electrical connection, or may be a direct connection, an indirect connection through an intermediate medium, internal communication between two elements, or an interaction relationship between two elements. A person of ordinary skill in the art may understand the meanings of the foregoing terms in the present disclosure according to a situation.

In the present disclosure, unless otherwise explicitly specified and limited, that a first feature is "above" or "below" a second feature means that the first feature and the second feature are in direct contact, or are in indirect contact through an intermediate medium. In addition, that the first feature is "above", "over", or "on" the second feature may mean that the first feature is above or obliquely above the second feature, or may merely mean that a horizontal position of the first feature is higher than that of the second feature. That the first feature is "below", "under", and "beneath" the second feature may mean that the first feature is under or obliquely below the second feature, or may merely mean that the horizontal position of the first feature is lower than that of the second feature.

In the description of the present disclosure, descriptions with reference to the term such as "an embodiment", "some embodiments", "example", "specific example", or "some examples" mean that features, structures, materials, or characteristics described with reference to the embodiment or example are included in at least one embodiment or example of the present disclosure. In this specification, illustrative expressions of these terms do not necessarily refer to the same embodiment or example. Moreover, the features, structures, materials, or characteristics described may be combined in any suitable manner in any one or more embodiments or examples. In addition, without mutual contradiction, a person skilled in the art may incorporate and combine different embodiments or examples and features of the different embodiments or examples described in this specification.

Although the embodiments of the present disclosure are shown and described above, it can be understood that the foregoing embodiments are and shall not be construed as a limitation on the present disclosure. A person of ordinary skill in the art may make changes, modifications, substitutions, and variations based on the foregoing embodiments within the scope of the present disclosure.

What is claimed is:

1. A hydraulic suspension system, comprising:
    a plurality of height adjustment apparatuses respectively corresponding to a plurality of wheels of a vehicle; and
    a central control apparatus, comprising a housing and a moving member, the moving member movably disposed in the housing and dividing the housing into a first region and a second region in a moving direction of the moving member, the first region comprising a first chamber and a second chamber that are isolated from each other, and the second region comprising a third chamber and a fourth chamber that are isolated from each other; and
    the first chamber, the second chamber, the third chamber, and the fourth chamber respectively communicated with the height adjustment apparatuses, the height adjustment apparatuses communicated with the first chamber and the second chamber corresponding to wheels located on a first diagonal of the vehicle, and the height adjustment apparatuses communicated with the third chamber and the fourth chamber corresponding to wheels located on a second diagonal of the vehicle; and
    wherein the moving member comprises a first part, a second part, and a third part, the first part moves axially along a side wall of the housing to divide the housing into the first region and the second region, the second part is connected to a first side of the first part and moves along the side wall of the housing to divide the first region into the first chamber and the second chamber, and the third part is connected to a second side of the first part and moves along the side wall of the housing to divide the second region into the third chamber and the fourth chamber; and
    wherein an extension direction of the first part is perpendicular to an extension direction of the second part and an extension direction of the third part.

2. The hydraulic suspension system according to claim 1, wherein a volume change of the first chamber and the second chamber in the first region is opposite to a volume change of the third chamber and the fourth chamber in the second region.

3. The hydraulic suspension system according to claim 1, wherein the first chamber, the second chamber, the third chamber, and the fourth chamber are disposed in the moving direction of the moving member.

4. The hydraulic suspension system according to claim 1, wherein in an initial state, a volume of the first chamber is the same as a volume of the fourth chamber, and a volume of the second chamber is the same as a volume of the third chamber.

5. The hydraulic suspension system according to claim 1, wherein the height adjustment apparatuses comprises at least a front-axle height adjustment apparatus and a rear-axle height adjustment apparatus, one of the front-axle height adjustment apparatus and the rear-axle height adjustment apparatus is communicated with the first chamber and the third chamber, and the other one of the front-axle height adjustment apparatus and the rear-axle height adjustment apparatus is communicated with the second chamber and the fourth chamber.

6. The hydraulic suspension system according to claim 1, wherein the height adjustment apparatuses comprise at least a front-axle height adjustment apparatus and a rear-axle height adjustment apparatus, one of the front-axle height adjustment apparatus and the rear-axle height adjustment apparatus is communicated with the first chamber and the fourth chamber, and the other one of the front-axle height adjustment apparatus and the rear-axle height adjustment apparatus is communicated with the second chamber and the third chamber.

7. The hydraulic suspension system according to claim 1, further comprising a liquid storage apparatus, wherein
the central control apparatus comprises a plurality of first connection ports, each of the height adjustment apparatuses comprises a shock absorber, the shock absorber is disposed in correspondence to one of the wheels and communicated with one of the first connection ports, the liquid storage apparatus is configured to deliver oil to the shock absorbers; and
the first connection ports comprise a first port, a second port, a third port, and a fourth port, and the first port, the second port, the third port, and the fourth port are respectively communicated with the first chamber, the second chamber, the third chamber, and the fourth chamber.

8. The hydraulic suspension system according to claim 7, wherein the shock absorber has a shock absorber housing, a piston, and a piston rod, the shock absorber housing is configured to be connected to one of the wheels, the piston is located in the shock absorber housing and is coupled with the shock absorber housing to define an upper chamber and a lower chamber, one end of the piston rod is connected to the piston, the piston rod is configured to be connected to a vehicle body, an oil channel is disposed in the piston rod, the oil channel is communicated with the lower chamber, and the liquid storage apparatus is configured to deliver the oil to the shock absorber through the oil channel.

9. The hydraulic suspension system according to claim 7, wherein each of the height adjustment apparatuses further comprises a connection channel and an accumulator module,
the connection channel is connected between the central control apparatus and the shock absorber; and
the accumulator module comprises a damping adjustment accumulator and an opening adjustment valve, the damping adjustment accumulator is connected between the shock absorber and the central control apparatus, and the opening adjustment valve is disposed between the damping adjustment accumulator and the shock absorber.

10. The hydraulic suspension system according to claim 1, wherein the housing has a first cylindrical body, a second cylindrical body, and a third cylindrical body that are disposed in the moving direction of the moving member,
an internal diameter of the second cylindrical body is greater than an internal diameter of the first cylindrical body and is greater than an internal diameter of the third cylindrical body, and
the first chamber is formed between the second part and an inner wall of the first cylindrical body, the first part is in contact with an inner wall of the second cylindrical body to divide the second cylindrical body into the second chamber and the third chamber, and the fourth chamber is formed between the third part and an inner wall of the third cylindrical body.

11. The hydraulic suspension system according to claim 1, wherein the first chamber and the second chamber are located on a first side of the first part, and the third chamber and the fourth chamber are located on a second side of the first part.

12. The hydraulic suspension system according to claim 1, further comprising a restoring spring disposed between the moving member and an end wall of the housing.

13. A vehicle, comprising the hydraulic suspension system according to claim 1.

14. A hydraulic suspension system comprising:
a central control apparatus comprising a housing, a moving member, a plurality of first connection ports, and a plurality of second connection ports;
a plurality of height adjustment apparatuses corresponding respectively to a plurality of wheels of a vehicle, wherein each of the height adjustment apparatuses comprises a shock absorber, and the shock absorber is disposed in correspondence to one of the wheels and communicated with one of the first connection ports; and
a liquid storage apparatus configured to deliver oil to the shock absorber of each of the height adjustment apparatuses;
wherein the moving member is movably disposed in the housing and divides the housing into a first region and a second region in a moving direction of the moving member, the first region comprises a first chamber and a second chamber that are isolated from each other, and the second region comprises a third chamber and a fourth chamber that are isolated from each other;
wherein the first chamber, the second chamber, the third chamber, and the fourth chamber are respectively communicated with the height adjustment apparatuses, the height adjustment apparatuses are communicated with the first chamber and the second chamber corresponding to wheels located on a first diagonal of the vehicle, and the height adjustment apparatuses are communicated with the third chamber and the fourth chamber corresponding to wheels located on a second diagonal of the vehicle;
wherein the first connection ports comprise a first port, a second port, a third port, and a fourth port, and the first port, the second port, the third port, and the fourth port are respectively communicated with the first chamber, the second chamber, the third chamber, and the fourth chamber; and
wherein each of the second connection ports is configured to communicate with the liquid storage apparatus; and
the second connection ports comprise a fifth port, a sixth port, a seventh port, and an eighth port, and the fifth port, the sixth port, the seventh port, and the eighth port are respectively communicated with the first chamber, the second chamber, the third chamber, and the fourth chamber.

15. The hydraulic suspension system according to claim 14, wherein an axis of the first connection ports is perpendicular to an axis of the second connection ports.

16. The hydraulic suspension system according to claim 14, further comprising control valves comprising a first control valve, a second control valve, a third control valve, and a fourth control valve, the first control valve disposed between the fifth port and the liquid storage apparatus, the second control valve disposed between the sixth port and the liquid storage apparatus, the third control valve disposed between the seventh port and the liquid storage apparatus, and the fourth control valve disposed between the eighth port and the liquid storage apparatus.

17. The hydraulic suspension system according to claim 16, wherein each of the control valves is configured to selectively communicate the liquid storage apparatus with one of a second connection port and the shock absorber.

18. The hydraulic suspension system according to claim 16, wherein a first connection channel is disposed between the first control valve and the fourth control valve, a fifth control valve is disposed on the first connection channel, a second connection channel is disposed between the second control valve and the third control valve, and a sixth control valve is disposed on the second connection channel.

19. A vehicle, comprising the hydraulic suspension system according to claim 14.

20. A hydraulic suspension system comprising:
a plurality of height adjustment apparatuses corresponding respectively to a plurality of wheels of a vehicle, wherein each of the height adjustment apparatuses comprises a shock absorber, a connection channel, and an accumulator module;
a central control apparatus comprising a housing, a moving member, and a plurality of first connection ports; and
a liquid storage apparatus is configured to deliver oil to the shock absorber of each of the height adjustment apparatuses;
wherein the moving member is movably disposed in the housing and divides the housing into a first region and a second region in a moving direction of the moving member, the first region comprises a first chamber and a second chamber that are isolated from each other, and the second region comprises a third chamber and a fourth chamber that are isolated from each other; and;
wherein the first chamber, the second chamber, the third chamber, and the fourth chamber are respectively communicated with the height adjustment apparatuses, the height adjustment apparatuses are communicated with the first chamber and the second chamber corresponding to wheels located on a first diagonal of the vehicle, and the height adjustment apparatuses are communicated with the third chamber and the fourth chamber corresponding to wheels located on a second diagonal of the vehicle;
wherein the shock absorber is disposed in correspondence to one of the wheels and communicated with one of the first connection ports;
wherein the connection channel is connected between the central control apparatus and the shock absorber;
wherein the accumulator module comprises a damping adjustment accumulator and an opening adjustment valve, the damping adjustment accumulator is connected between the shock absorber and the central control apparatus, and the opening adjustment valve is disposed between the damping adjustment accumulator and the shock absorber; and
wherein the accumulator module further comprises a stiffness adjustment accumulator and a stiffness adjustment valve, a stiffness adjustment connection point is disposed on the connection channel, the stiffness adjustment accumulator is communicated with the stiffness adjustment connection point, and the stiffness adjustment valve is disposed between the stiffness adjustment accumulator and the stiffness adjustment connection point.

21. The hydraulic suspension system according to claim 20, wherein each of the height adjustment apparatuses further comprises a seventh control valve, and the seventh control valve is disposed between the stiffness adjustment connection point and the damping adjustment accumulator.

22. A vehicle, comprising the hydraulic suspension system according to claim 20.

* * * * *